United States Patent [19]

Kohchi

[11] Patent Number: 5,574,354
[45] Date of Patent: *Nov. 12, 1996

[54] STORAGE BATTERY CHARGING STATION FOR ELECTRIC VEHICLES

[75] Inventor: Akira Kohchi, Ashiya, Japan

[73] Assignee: Institute for Home Economics of Japan, Inc., Hyogo, Japan

[ * ] Notice: The term of this patent shall not extend beyond the expiration date of Pat. No. 5,449,995.

[21] Appl. No.: 406,160

[22] Filed: Mar. 17, 1995

Related U.S. Application Data

[62] Division of Ser. No. 222,906, Apr. 5, 1994, Pat. No. 5,449,995.

[30] Foreign Application Priority Data

Apr. 6, 1993 [JP] Japan ........................... 5-79722

[51] Int. Cl.$^6$ .................................................. H01M 10/46
[52] U.S. Cl. .............................................. 320/15; 104/34
[58] Field of Search ................................... 320/2, 15, 18, 320/35, 46; 414/222, 223, 224, 238, 251, 285, 672; 104/34

[56] References Cited

U.S. PATENT DOCUMENTS

| | | | |
|---|---|---|---|
| 581,803 | 5/1897 | Armstrong | 414/251 |
| 4,299,526 | 11/1981 | Smith | 414/392 |
| 4,334,819 | 6/1982 | Hammerslag | 414/395 |
| 4,413,219 | 11/1983 | Ducharme et al. | 320/15 |
| 4,450,400 | 5/1984 | Gwyn | 320/2 |
| 4,983,903 | 1/1991 | Bae et al. | 320/2 |
| 5,091,687 | 2/1992 | Meyer et al. | 320/2 |
| 5,360,307 | 11/1994 | Schemm et al. | 320/2 X |
| 5,449,995 | 9/1995 | Kohchi | 320/15 |

FOREIGN PATENT DOCUMENTS

| | | | |
|---|---|---|---|
| 59-81874 | 5/1984 | Japan . | |
| 52-19606 | 8/1993 | Japan . | |
| 270393 | 5/1927 | United Kingdom | 414/238 |
| 2249544 | 5/1992 | United Kingdom | 414/251 |

*Primary Examiner*—Edward H. Tso
*Attorney, Agent, or Firm*—Price, Gess & Ubell

[57] ABSTRACT

A large number of vehicular batteries are charged while riding on gondolas, which go upon down and around in a space-saving tall tower. Charging electricity is distributed along the path of Gondola carriages. One or more recharged batteries are removed from the Gondolas which become ready to accept spent batteries, The gondola can be enlarged to accommodate even a battery-loaded vehicle.

11 Claims, 3 Drawing Sheets

STORAGE BATTERY CHARGING STATION FOR ELECTRIC VEHICLES

FIELD OF THE INVENTION

This is a division of prior application Ser. No. 08/222,906, filed on Apr. 5, 1994, now U.S. Pat. No. 5,449,995, for a BATTERY CHARGING STATION.

This invention relates to the charging of batteries, and more particularly to a roadside station at which point spent driving power sources of electric vehicles are continuingly recharged and held ready for re-use.

BACKGROUND OF THE INVENTION

The driving power source for electric vehicles consists of accumulator battery in plural units. The battery is manufactured in such a way as to permit a manual handling of it as a unitary power pack. The battery occupies a substantial part of the total vehicular weight and bulk. Also battery capacity determines the driving range of an electric vehicle and in recharging run-down batteries, it becomes obligatory that the vehicle be hooked up with stationary outlets of electricity, rendering the vehicle useless for the duration of the recharge operation which on average lasts several hours. Rapid recharge systems represent an effort to reduce this binding time and would restore charge capacity in the order of several ten minutes up to a ceiling yet limited to about 60 percent of the full battery capacity such system requires extremely high voltage and high with resultant hazards and shortened battery-life. Battery swapping systems, also in recent study, suffer from the lack of support procedures such as how to efficiently recycle swapped batteries.

SUMMARY OF THE INVENTION

An object of the present invention then is to provide a charging apparatus for a battery, either singularly or severally, as in a power pack or otherwise, off- or on-board a vehicle alike.

It is another object of this invention to provide a storage capable of holding a multiplicity of charged batteries ready for delivery on demand.

It is a further object of the invention to provide a space-saving roadside station in which both the charge and store operations are carried out concurrently.

These objects are addressed by the present invention which provides a novel battery charge-while-in-store apparatus comprising a vertical link-chain conveyor means, gondola carriages, electricity distributing means disposed alongside the conveyor means, and a hollow tower which supports and houses them all. Batteries are placed on the gondola which is suspended from a rod transversely held by and over a pair of said conveyors. Through the ends of the rods keeping contact with the distributor, a charging electricity is continuingly supplied to a large number of batteries.

Further objects, features and advantages of the invention will become apparent from the following description when taken in conjunction with the accompanying drawings.

DESCRIPTION OF THE PREFERRED EMBODIMENT

Figure 1:
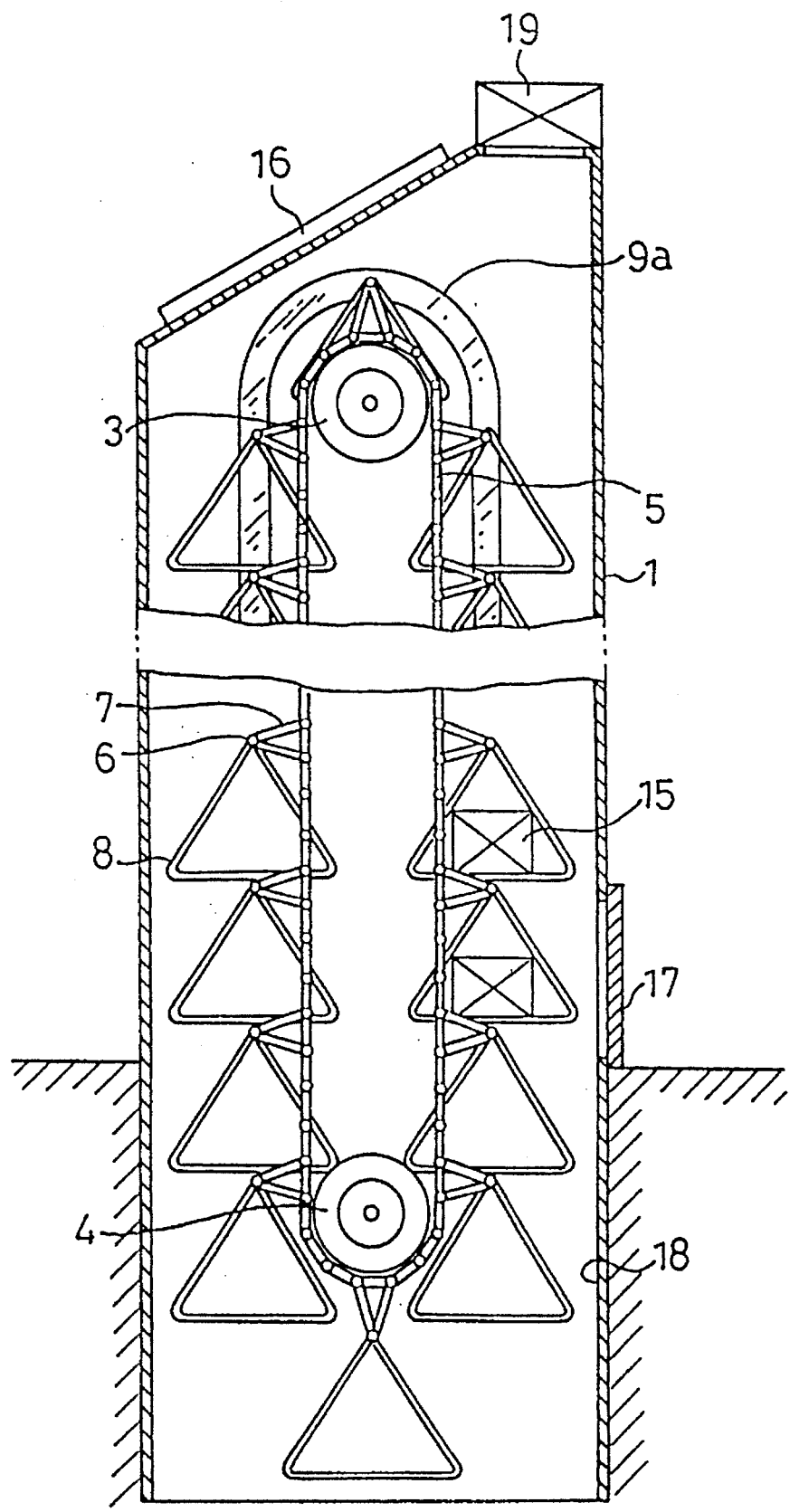
FIG. 1 illustrates a schematic cross-sectional view of a charge-while-in-store apparatus constructed in accordance with the invention.

As shown in FIG. 1 illustrating a schematic cross-sectional view, a pair of vertically disposed parallel link-chains 5 are carried by matching pairs of sprockets 3 and 4. Opposing link-chains 5 are tied to each other from place to place by transversely disposed hollow rods 6 which are supported through bearing attachments 7 firmly held by member links. From the rods 6, suspended one each, are frame-formed gondolas 8, and such a gondola carriage is known as able to maintain its load batteries 15 at an even level while in a rotary motion.

A pair of distributors 9a and 9b (not shown) made of an electricity conducive material into continuous rings of the shape identical with the track traced by the rod 8 is placed outwardly adjacent to the pair of link-chains 5. Power lines (not shown) brought in to a tower house 1 are used to energize said distributors 9a and 9b which transform to an anode and a cathode respectively, and as many charging circuits as there are connected batteries 15 on the gondolas 8.are closed through the ends of the rods which are protruding and held in a constant contact with said distributors 9a and 9b, thereby permitting a continuing charge operation irrespective of the location or motion of the batteries 15.

The tower house 1 also houses a conventional driving mechanism (not shown) for the sprockets 3 or 4. The tower house 1 is equipped with solar panels 16 and at a top with a collector unit 19, in which gases and heat exuded by the battery charge operations are collected and recycled. Located at the ground. level is a door 17 through which the batteries 15 are loaded or enloaded. The tower house 1 can be built up from an underground space 18, utilizing for instance a cave which will be left behind by excavated gasoline tanks of the Gasoline stations abandoned for environmental reasons, to as tall a height as appropriate, thus providing an efficient storage for a large number of charged batteries ready to be delivered to the user.

Figure 2:
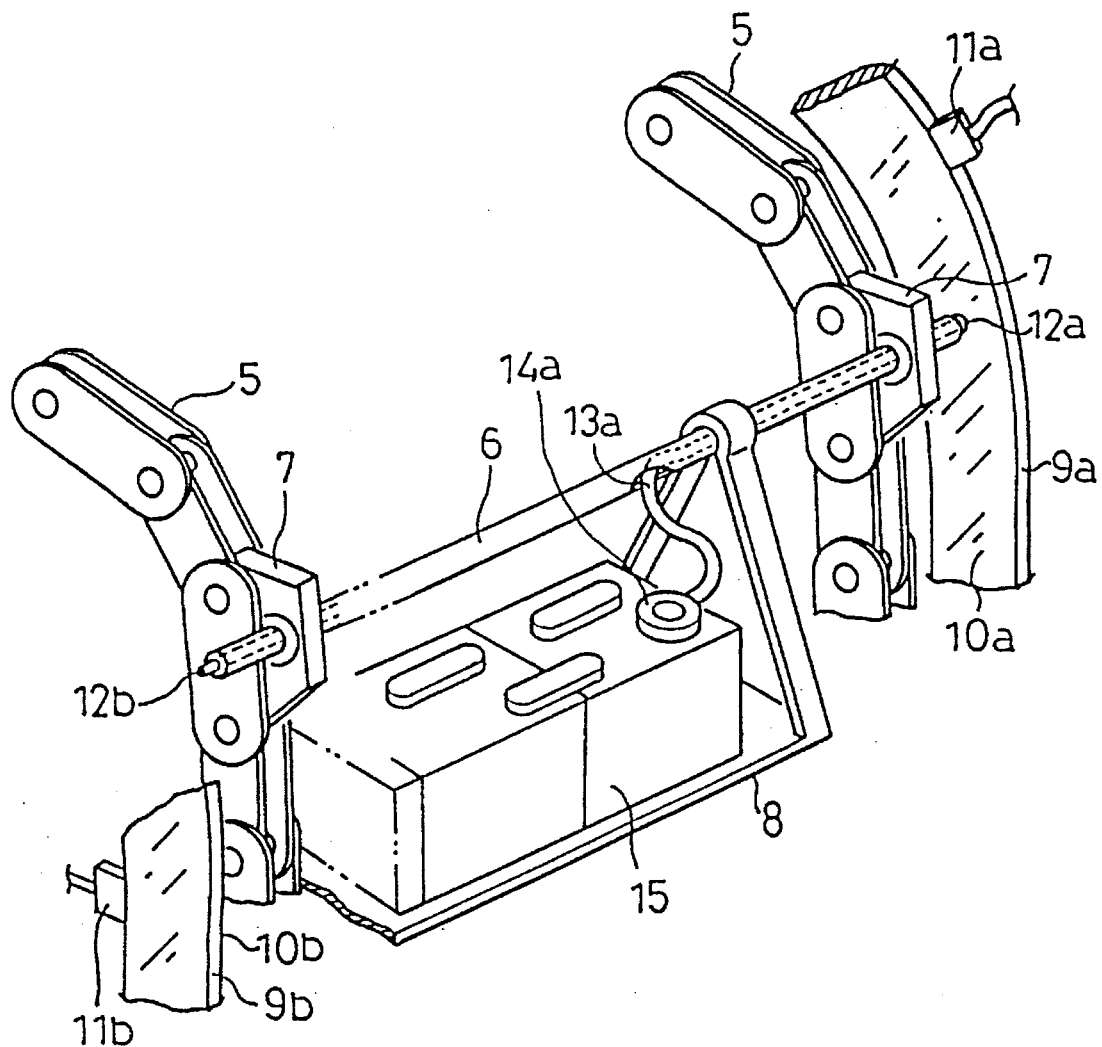
FIG. 2 illustrates a perspective view of batteries under charge together with parts relating to the charging circuit.

Referring to FIG. 2 that shows a detailed view of the parts involved in closing a charge circuit, an outside power line is split and attached to the distributors 9a and 9b at points 11a and 11b respectively. Electricity led by a tensioned contact point 12a which maintains a constant contact with a contact surface 10a is directed through a lead line 13a running within the rod 6 to a battery terminal 14a. From the opposite last terminal and through the reverse path, electricity reaches at the distributor 9b. The link-chains 5 are of a dual member type and the bearing attachment 7 rotably supports the rod 6.

It will be appreciated that although only the batteries 15 are illustrated for the sake of simplicity, the gondola 8 may be designed to receive a power pack of batteries (as described in Japanese Patent Application 5-166909 filed on Jul. 6, 1993), an electricity supply unit on wheels (as described in Japanese Patent Application 5-221929 filed on Sep. 7, 1993) or even a battery run-down electric vehicle.

Figure 3:
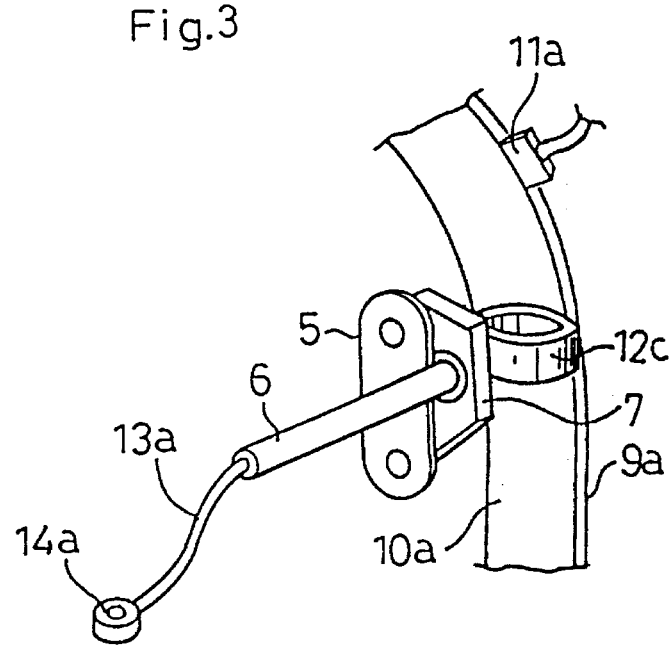
FIG. 3 illustrates a modification of the electrical contacts marked 12a in FIG. 2.

FIG. 3 shows a modification of the tensioned contact point 12a of FIG. 2, providing a pantagraph 12c.

Figure 4:
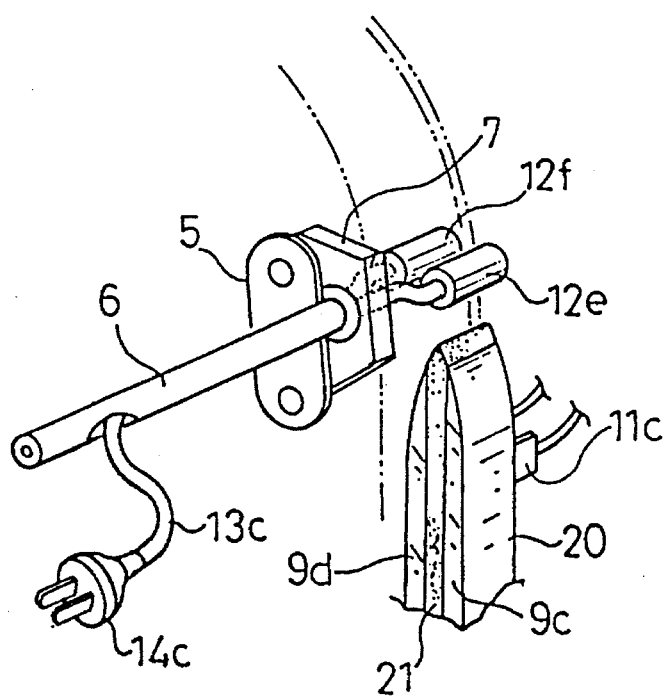
FIG. 4 illustrates a modification of the distributors marked 9a and 9b in FIG. 2.

FIG. 4 shows a modification of the pair of oppositely disposed ring distributors 9a and 9b of FIG. 2, providing a straight rail 20 in which plank-distributors 9c and 9d sandwich an insulator 21. Electricity led by a roller contact 12e is directed through a male plug 14c and back to a roller contact 12f. This modification disrupts a continuous charging during lateral movements of the gondolas 8 shown in FIG. 1.

Since the batteries brought in are at various stages of need, recharge operations are individually or centrally controlled as to timing or protection against overcharging by devices available in the market. Another modification (not shown) then provides a number of point distributors disposed to come into contact with the corresponding contact points 12a of FIG. 2 or with any other means provided on said carriages 8 at the time that the link-chains 5 stand stationary as during the load-unload operations of batteries through the door 17.

Having described but a preferred embodiment of the invention, it will be appreciated that variations can be made thereto without departing from the spirit or scope of the invention.

What is claimed is:

1. An assembly for storing and recharging batteries comprising:
   a plurality of carriages having respective support surfaces of a configuration to each support a battery;
   conveyor means connected to the carriages to translate the carriages across a predetermined path of travel during storage;
   connector means provided on each of the carriages for electrically connecting the batteries to recharge them;
   power means for providing a source of electricity to said connector means as the conveyor means translates the carriages during storage; and
   means for collecting and processing any gases and heat produced during the recharging of the batteries.

2. The assembly as defined in claim 1 wherein the power means includes a pair of distributors extending along the predetermined path of travel.

3. The assembly as defined in claim 1 wherein the conveyor means rotates the carriages in a path having a vertical axis.

4. An assembly for storing and recharging batteries comprising:
   a plurality of carriages having respective support surfaces of a configuration to support batteries;
   conveyor means connected to the carriages to translate the carriages across a predetermined path of travel during storage, including support rods which pivotally support each carriage;
   connector means provided on each of the carriages for electrically connecting the batteries to recharge them; and
   power means for providing a source of electricity to each connector means as the conveyor means translates the carriages during storage, including a pair of contact members on each support rod and a pair of distributors extending along the predetermined path of travel and respectively contacting a contact member.

5. The assembly as defined in claim 4 wherein the conveyor means rotates the carriages in a path having a vertical axis.

6. A vehicular battery charging station comprising:
   an enclosed tower structure having doors at ground level for receiving or delivering batteries therethrough;
   two pairs of rotors located inside said structure, one at a top end and the other at a bottom end of said structure, said rotors having horizontal shafts thereof journaled to said structure;
   driving means for rotating at least one of said shafts;
   a pair of conveyor means installed over said top and bottom rotors and circling around said rotors;
   a plurality of rods disposed transversely over said pair of conveyor means and attached to said conveyor means;
   a carriage suspended from each of said rods and free to swing around associated rod, each of said carriages having the capacity of receiving batteries thereon;
   a power source of electricity for charging said batteries;
   distributing means of electricity from said power source to said carriages, said distributing means disposed alongside the path of said carriage rods and supplying electricity either continuously or intermittently during rotation of said conveyor means; and
   means provided on each of said carriages for electrically connecting said electricity distributing means with terminal posts on said batteries.

7. The vehicular battery charging station as defined in claim 6, wherein said bottom rotors are located beneath the ground level.

8. The vehicular battery charging station as defined in claim 6, wherein said distributing means of electricity includes a pair of continuous belts disposed outward and alongside the path of said carriage rods and maintaining contact therewith.

9. The assembly as defined in claim 4, wherein the support rods are hollow and power lead lines extend through the support rods to connect the batteries with the power means.

10. The vehicular battery charging station as defined in claim 6, wherein the rods are hollow and the means provided on each of said carriages for electrically connecting include power lead lines extending through the support rods to connect with terminal posts on said batteries.

11. The vehicular battery charging station as defined in claim 6, wherein the distributing means is continuously supplying electricity during rotation of said conveyor means.

* * * * *